(12) United States Patent
Prescavage et al.

(10) Patent No.: US 10,738,825 B2
(45) Date of Patent: Aug. 11, 2020

(54) DOUBLE ROW TAPERED ROLLER BEARING ASSEMBLY HAVING A TWO-PIECE OUTER RING

(71) Applicant: Roller Bearing Company of America, Inc., Oxford, CT (US)

(72) Inventors: James Prescavage, Hainesport, NJ (US); Roman Malychok, Jamison, PA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 16/403,918

(22) Filed: May 6, 2019

(65) Prior Publication Data

US 2019/0345978 A1 Nov. 14, 2019

Related U.S. Application Data

(60) Provisional application No. 62/668,578, filed on May 8, 2018.

(51) Int. Cl.
| | |
|---|---|
| *F16C 19/18* | (2006.01) |
| *F16C 33/36* | (2006.01) |
| *F16C 33/60* | (2006.01) |
| *F16C 19/38* | (2006.01) |
| *F16C 33/66* | (2006.01) |

(52) U.S. Cl.
CPC ........ *F16C 19/385* (2013.01); *F16C 33/6677* (2013.01)

(58) Field of Classification Search
CPC ...... F16C 19/385; F16C 19/386; F16C 33/36; F16C 33/366; F16C 33/523; F16C 33/526; F16C 33/60
See application file for complete search history.

(56) References Cited

U.S. PATENT DOCUMENTS

| | | | |
|---|---|---|---|
| 4,030,785 A | * | 6/1977 | Robinson .............. F16C 19/385 384/474 |
| 9,140,296 B2 | | 9/2015 | Caspall |
| 9,441,673 B2 | | 9/2016 | Katsaros |
| 2015/0139583 A1 | | 5/2015 | Kullin et al. |

(Continued)

FOREIGN PATENT DOCUMENTS

| | | |
|---|---|---|
| CN | 202468700 U | 10/2012 |
| CN | 202811826 U | 3/2013 |
| CN | 108488227 A | 9/2018 |

(Continued)

*Primary Examiner* — Phillip A Johnson
(74) *Attorney, Agent, or Firm* — Murtha Cullina LLP

(57) ABSTRACT

A tapered roller bearing assembly includes a one-piece inner ring that has two outer raceways oriented at angles relative to a longitudinal axis and a first outer ring with a first inner raceway and a second outer ring having a second inner raceway. The bearing assembly includes a spacer ring that has an axial width and is positioned around the inner ring and between the first and outer rings. A plurality of rolling elements is in rolling engagement with the first outer raceway and the first inner raceway. A plurality of rolling elements is in rolling engagement with the second outer raceway and the second inner raceway. The axial width is selectively established to obtain a predetermined axial clearance between the inner ring and the first outer ring and the second outer ring.

28 Claims, 6 Drawing Sheets

(56) References Cited

U.S. PATENT DOCUMENTS

2015/0275971 A1* 10/2015 Bouron ............... F16C 33/60 384/562
2018/0298943 A1 10/2018 Takarabe et al.

FOREIGN PATENT DOCUMENTS

| | | |
|---|---|---|
| CN | 109307014 A | 2/2019 |
| DE | 3621381 C2 | 9/1991 |
| DE | 102009051556 A1 | 5/2011 |
| DE | 102010040748 A1 | 3/2012 |
| DE | 102012208011 A1 | 11/2013 |
| DE | 102015215315 A1 | 2/2016 |
| DE | 102015225678 A1 | 6/2016 |
| DE | 102015118887 A1 | 5/2017 |
| EP | 1837535 A1 | 9/2007 |
| EP | 2035718 B1 | 6/2016 |
| ES | 1206561 U | 3/2018 |
| GB | 393893 A * | 6/1933 .......... F16C 33/6681 |
| GB | 579798 A | 8/1946 |
| GB | 2166204 A | 4/1986 |
| JP | 08184313 A * | 7/1996 .............. F16C 33/60 |
| JP | 11132229 A | 5/1999 |
| JP | 2000081035 A * | 3/2000 .............. F16C 33/60 |
| JP | 200320550 A | 11/2000 |
| JP | 2005140157 A | 6/2005 |
| JP | 3877864 B2 | 2/2007 |
| JP | 2007051669 A | 3/2007 |
| JP | 2014122649 A * | 7/2014 .......... F16C 33/7886 |
| KR | 1020010033245 A | 4/2001 |
| WO | 2009042478 A1 | 4/2009 |
| WO | 2011045146 A1 | 4/2011 |
| WO | 2012128316 A1 | 9/2012 |
| WO | 2015127913 A1 | 9/2015 |
| WO | 2017007922 A1 | 1/2017 |

* cited by examiner

DOUBLE ROW TAPERED ROLLER BEARING ASSEMBLY HAVING A TWO-PIECE OUTER RING

CROSS REFERENCE TO RELATED APPLICATIONS

This application claims the benefit of U.S. Provisional Patent Application Ser. No. 62/668,578 filed on May 8, 2018, which is incorporated herein by reference in its entirety.

TECHNICAL FIELD

The present invention is directed to a double row tapered roller bearing assembly having a one-piece inner ring and a two-piece outer ring having a first outer ring and a second outer ring, and more particularly to such a tapered roller bearing assembly in which a spacer ring is disposed between the first outer ring and the second outer ring to selectively establish a predetermined axial clearance between the inner ring and the first and second outer rings.

BACKGROUND

As shown in FIG. 3, typical spherical roller bearings 100 include an inner ring member 112 have a cylindrical inside diameter surface extending through and an exterior surface consisting of two spherical shaped bearing surfaces 114A and 114B, positioned inside a one piece outer ring 116 having an inside diameter surface of two spherical shaped bearing surfaces 118A and 118B and a cylindrical outside diameter surface. Affixed between the inner ring 112 and the outer ring 116 are two rows of a plurality of spherically shaped rollers 120A and 120B equally spaced and guided by a centrally located cage member 122. It is difficult in some mechanical applications utilizing such prior art spherical roller bearings, to precisely control the axial looseness between the inner ring 112 the outer ring 116 and the plurality of rollers 120A and 120B. Thus operating efficiency cannot be precisely optimized.

In the bearing industry, the geometry of the Tapered Roller Bearings is standardized by American Bearing Manufacturers Association (AMBA) standard.

Based on the foregoing, there is a need to provide a bearing that has the capability of more precisely establishing axial clearance therein.

SUMMARY

There is disclosed herein a tapered roller bearing assembly that includes a one-piece inner ring that is concentric about a longitudinal axis. The inner ring has a first outer raceway oriented at a first angle relative to the longitudinal axis and a second outer raceway oriented at a second angle relative to the longitudinal axis. The tapered roller bearing assembly includes a first outer ring that has a first inner raceway oriented substantially parallel to the first outer raceway. The first outer ring is positioned around a portion of the inner ring. The tapered roller bearing assembly includes a second outer ring that has a second inner raceway oriented substantially parallel to the second outer raceway. The second outer ring is positioned around a portion of the inner ring. The tapered roller bearing assembly includes a spacer ring that has a predetermined axial width. The spacer ring is positioned around a portion of the inner ring and between the first outer ring and the second outer ring. The tapered roller bearing assembly has a plurality of first rolling elements disposed between the first outer ring and the inner ring. The first rolling elements are in rolling engagement with the first outer raceway and the first inner raceway. The tapered roller bearing assembly has a plurality of second rolling elements disposed between the second outer ring and the inner ring. The second rolling elements are in rolling engagement with the second outer raceway and the second inner raceway. The predetermined width is selectively established to obtain a predetermined axial clearance between the inner ring and the first outer ring and the second outer ring.

In one embodiment, the second angle is 180 degrees minus the first angle. In one embodiment the first angle is from 11 degrees to 12 degrees.

In one embodiment, the spacer ring, the first outer ring and the second outer ring each have a plurality of bores axially extending therethrough. The bores are positioned circumferentially around peripheries thereof and are equally spaced apart from adjacent bores. In one embodiment, the bores are equally spaced circumferentially apart from one another. A fastener extends into each of the bores to secure the spacer ring between the first outer ring and the second outer ring to establish the predetermined axial clearance. In one embodiment, the fastener includes a head portion proximate a first end thereof and a threaded area proximate a second end thereof. The threaded area has a locking device (e.g., a washer, thread locking compound and/or locking inserts such as nylon inserts) and a nut thereon. The nut is tightened on the threaded area thereby compressing the locking between the nut and the first outer ring or the second outer ring.

In one embodiment, the spacer ring, the first outer ring and/or the second outer ring is manufactured from a metallic material, such as an iron based alloy. A portion of an axial surface the first outer ring and/or the second outer has a first hardness that is less than a second hardness of other portions of the first outer ring and/or the second outer ring. In one embodiment, the other portions of the first outer ring and/or the second outer ring are carburized with the first portions being masked during carburizing to obtain the first hardness. In one embodiment, the locking device has teeth that grip the first portion of first outer ring and/or the second outer ring.

In one embodiment, the spacer ring includes a circumferential channel on an exterior circumferential surface thereof. The spacer ring has one or more holes extending radially therethrough for supplying a lubricant to an interior area within the tapered roller bearing.

In one embodiment, the tapered roller bearing assembly of includes a first pinned cage configured to circumferentially space each of the first rolling elements from adjacent ones of the first rolling elements. In one embodiment, the first pinned cage includes a first annular disc and a second annular disc having a plurality of first pins extending therebetween. One of the first rolling elements is rotatingly mounted on a respective one of the first pins.

In one embodiment, the tapered roller bearing assembly includes a second pinned cage configured to circumferentially space each of the second rolling elements from adjacent ones of the second rolling elements. In one embodiment, the second pinned cage includes a third annular disc and a fourth annular disc having a plurality of second pins extending therebetween. One of the second rolling elements is rotatingly mounted on a respective one of the second pins.

DETAILED DESCRIPTION

Figure 5:
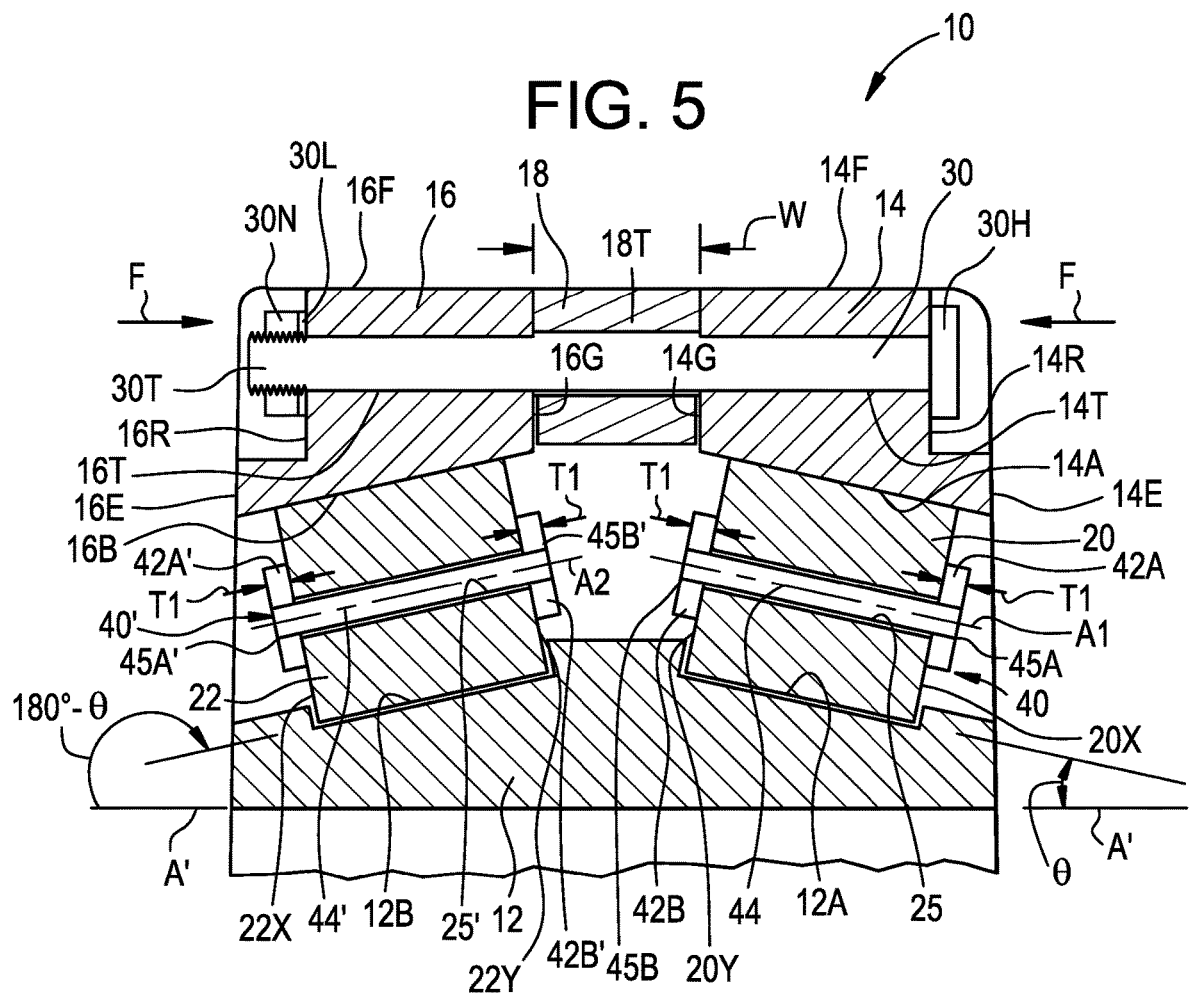
FIG. 5 is an enlarged view of detail 5 of FIG. 1.

As shown in FIG. 5, the first angle θ is from 11 degrees to 12 degrees; and the second angle is 180 degrees minus the first angle θ.

Figure 1:
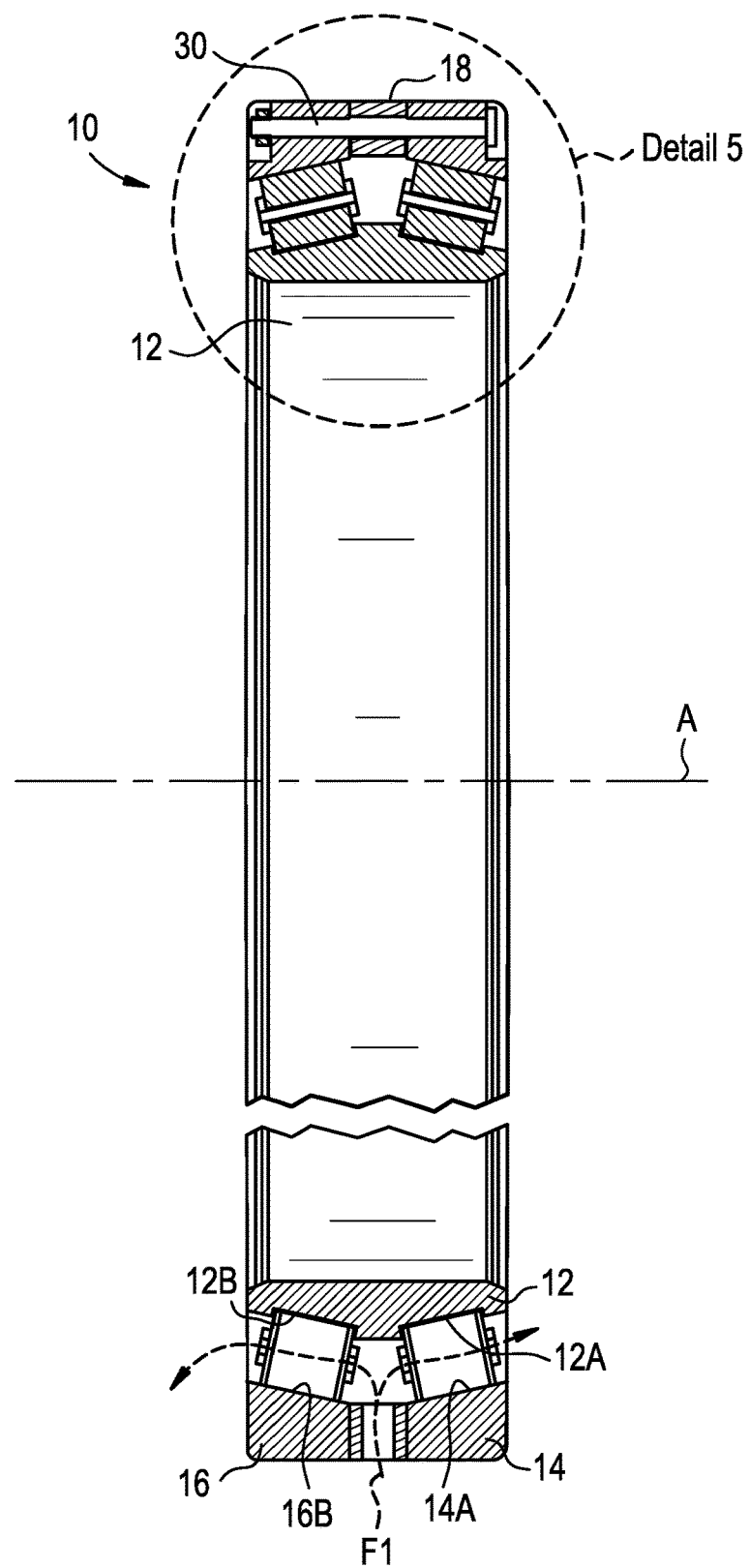
FIG. 1 is a cross sectional view of the tapered roller bearing of the present invention.

As shown in FIG. 1, a tapered roller bearing assembly of the present invention is generally designated by the numeral 10. The tapered roller bearing assembly 10 includes a one-piece inner ring 12 that is concentric about a longitudinal axis A. As best shown in FIG. 5, the inner ring 12 has a first outer raceway 12A oriented at a first angle θ relative to the longitudinal axis A or relative to a line A' parallel to the longitudinal axis A. The inner ring 12 has a second outer raceway 12B oriented at a second angle 180−θ relative to the longitudinal axis A or relative to the line A' parallel to the longitudinal axis A.

As best shown in FIG. 5, the tapered roller bearing assembly 10 includes a first outer ring 14 that has a first inner raceway 14A oriented substantially parallel to the first outer raceway 12A. The first outer ring 14 is positioned around a portion of the inner ring 12. The tapered roller bearing assembly 10 includes a second outer ring 16 having a second inner raceway 16B that is oriented substantially parallel to the second outer raceway 12B. The second outer ring 16 is positioned around a portion of the inner ring 12. The tapered roller bearing assembly 10 includes a spacer ring 18 having a predetermined axial width W. The spacer ring 18 is positioned around a portion of the inner ring 12 and between the first outer ring 14 and the second outer ring 16. The spacer ring 18, the first outer ring 14 and the second outer ring 16 are coaxial and concentric about the longitudinal axis A.

As best shown in FIG. 5, a plurality of first rolling elements 20 is disposed between the first outer ring 14 and the inner ring 12 and in rolling engagement with the first outer raceway 12A and the first inner raceway 14A. As described herein a pinned cage 40 circumferentially spaces each of the first rolling elements 20 from adjacent ones of the first rolling elements 20. A plurality of second rolling elements 22 is disposed between the second outer ring 16 and the inner ring 12 and in rolling engagement with the second outer raceway 12B and the second inner raceway 16B. As described herein a pinned cage 40' circumferentially spaces each of the second rolling elements 22 from adjacent ones of the second rolling elements 22.

Figure 6:
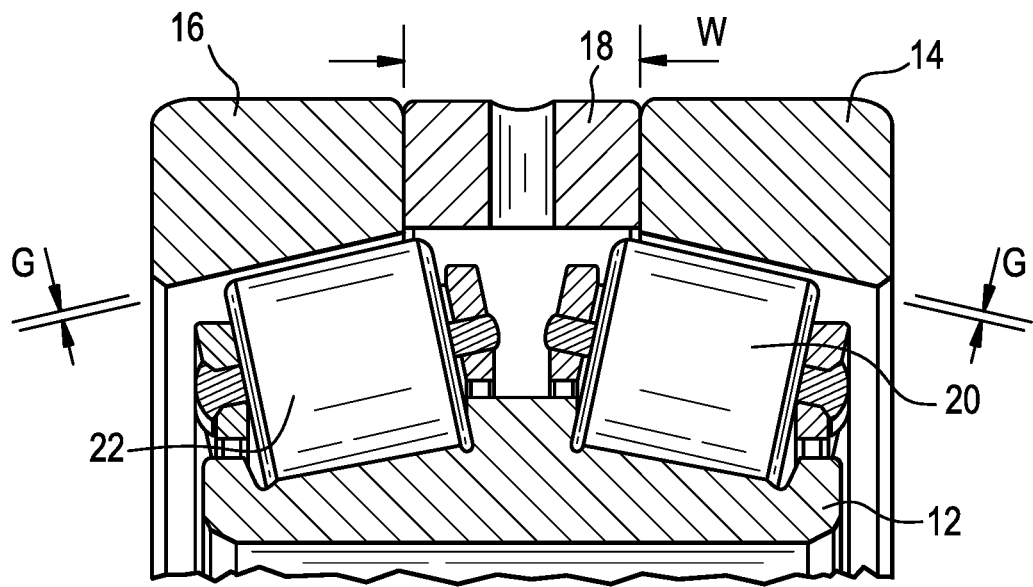
FIG. 6 cross sectional view showing axial clearance.
Figure 7:
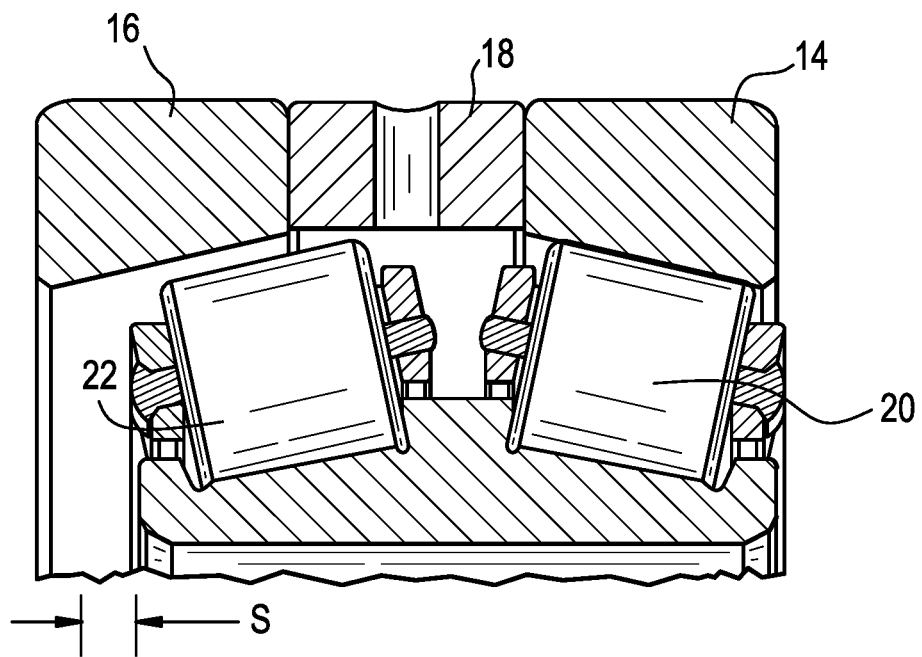
FIG. 7 cross sectional view showing axial movement created by axial clearance

The predetermined width W of the spacer ring 18 is selectively established to obtain a predetermined axial clearance (e.g., tightness and looseness) between the inner ring 12 and the first outer ring 14 and the second outer ring 16, shown as a gap G in FIG. 6, the magnitude of which is controlled by the width W of spacer 18 which is placed between the first outer ring 14 and the second outer ring 16. This axial clearance translates to axial movement inner ring 12, S of FIG. 7, along axis A, when the bearing is functioning in the application. For example, as shown in FIG. 5, as the width W of the spacer ring 18 is decreased and the first outer ring 14 and the second outer ring 16 are compressed axially toward one another in the direction of the arrows F, the first rolling elements 20 are wedged tighter (i.e., a decrease in axial clearance) between the first outer race 12A and the first inner race 14A; and the second rolling elements 22 are wedged tighter (i.e., a decrease in axial clearance) between the second outer race 12B and the second inner race 16B, resulting in an increase in operating torque compared to configurations with a lesser width W. For example, as the width W of the spacer ring 18 is increased and the first outer ring 14 and the second outer ring 16 are decompressed axially away from one another opposite the direction of the arrows F, the first rolling elements 20 are wedged looser (i.e., an increase in axial clearance) between the first outer race 12A and the first inner race 14A; and the second rolling elements 22 are wedged looser (i.e., an increase in axial clearance) between the second outer race 12B and the second inner race 16B, resulting in an decrease in operating torque compared to configurations with a greater width W. Additionally, the control of axial clearance permits optimization of the distribution of applied load among the plurality of first rolling elements 20 and the second rolling elements 22, thereby optimizing service life of the bearing assembly.

As shown in FIG. 5, the spacer ring 18, the first outer ring 14 and the second outer ring 16 each of have a plurality of bores 18T, 14T and 16T, respectively axially extending therethrough and positioned circumferentially around peripheries thereof. The plurality of bores 18T, 14T and 16T are equally spaced circumferentially apart from one another and are axially aligned. A fastener 30 extends into and through each of the bores 18T, 14T and 16T to secure the spacer ring 18 between the first outer ring 14 and the second outer ring 16 to establish the predetermined axial clearance. The fastener 30 has a head portion 30H proximate a first end thereof and a threaded area 30T proximate a second end thereof. The threaded area 30T has a locking device, for example, a lock washer 30L and nut 30N thereon. The nut 30N is tightened on the threaded area 30T thereby compressing the lock washer 30L between the nut 30N and a portion of the second outer ring 16. The head portion 30H of the fastener 30 engages a portion of the first outer ring 14. While the locking device is shown and described as being the lock washer 30L, the present invention is not limited in this regard as other locking devices may be employed, such as, but not limited to the use of a locking compound on the threaded area 30T and the use of a nut with a nylon insert for locking the nut 30N to the threaded area 30T.

Figure 4:
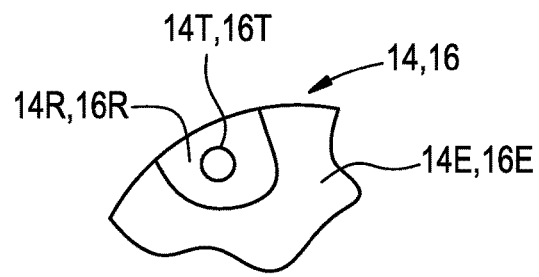
FIG. 4 is an enlarged view of a recessed portion of detail 4 of FIG. 2.

The spacer ring 18, the first outer ring 14 and/or the second outer ring 16 is manufactured from a metallic material, for example an iron based alloy, carbon steel and AISI 3310 steel. As shown in FIG. 4, in one embodiment a portion (e.g., a first portion) of an axial surface 14R of the first outer ring 14 and/or a portion (e.g., a second portion) of an axial surface 16R of the second outer ring 16 has a first hardness that is less than a second hardness of other portions 14E, 14F, 14G (and the first raceway 14B) of the first outer ring 14 and other portions 16E, 16F, 16G (and the second raceway 16B) the second outer ring 16. The other portions 14E, 14F, 14G (and the first raceway 14B) of the first outer ring 14 and 16E, 16F, 16G (and the second raceway 16B) of the second outer ring 16 are carburized with the first portion of the axial surface 14R of the first outer ring 14 and/or the second portion of the axial surface 16R of the second outer ring 16 being masked during carburizing to obtain the first hardness. In one embodiment, the spacer ring 18 is carburized. In one embodiment, the second hardness is from 58 to 62 Rockwell C. In one embodiment, the first hardness is from 24 to 28 Rockwell C.

Figure 8:
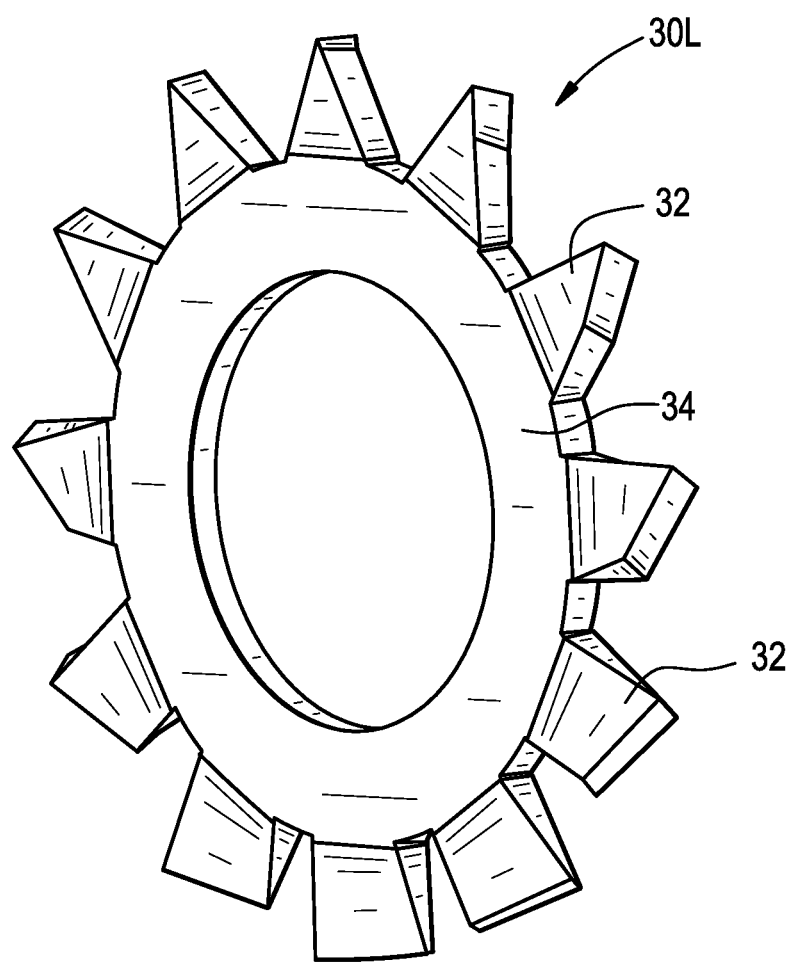
FIG. 8 is a schematic drawing of a lock washer employed in the tapered roller bearing.

As shown in FIG. 8, the lock washer 30L has a plurality of teeth 32 extending from an annular portion 34 thereof. The teeth 32 grip the softer second portion of the axial surface 16R of the second outer ring 16. In one embodiment, the fastener 30 is installed in a reverse direction so that the head portion 30H engages the first portion of the axial surface 14R of the first outer ring 14 and the lock washer 30L is compressed between the nut 30N and the first portion of the axial surface 14R of the first outer ring 14; and the teeth 32 grip the softer first portion of the axial surface 14R of the first outer ring 14.

Figure 2:
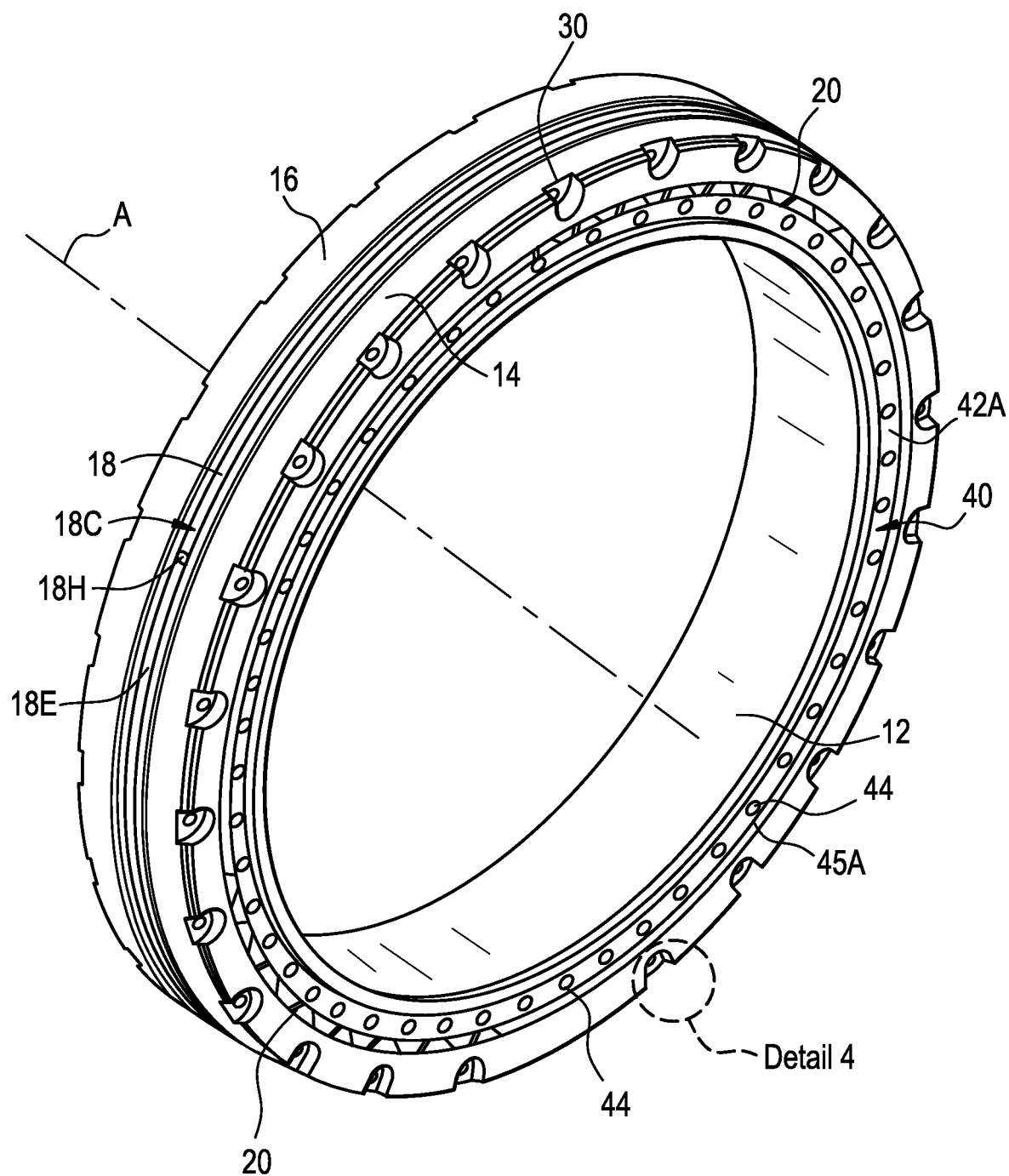
FIG. 2 is a perspective view of the tapered roller bearing of FIG. 1.
Figure 3:
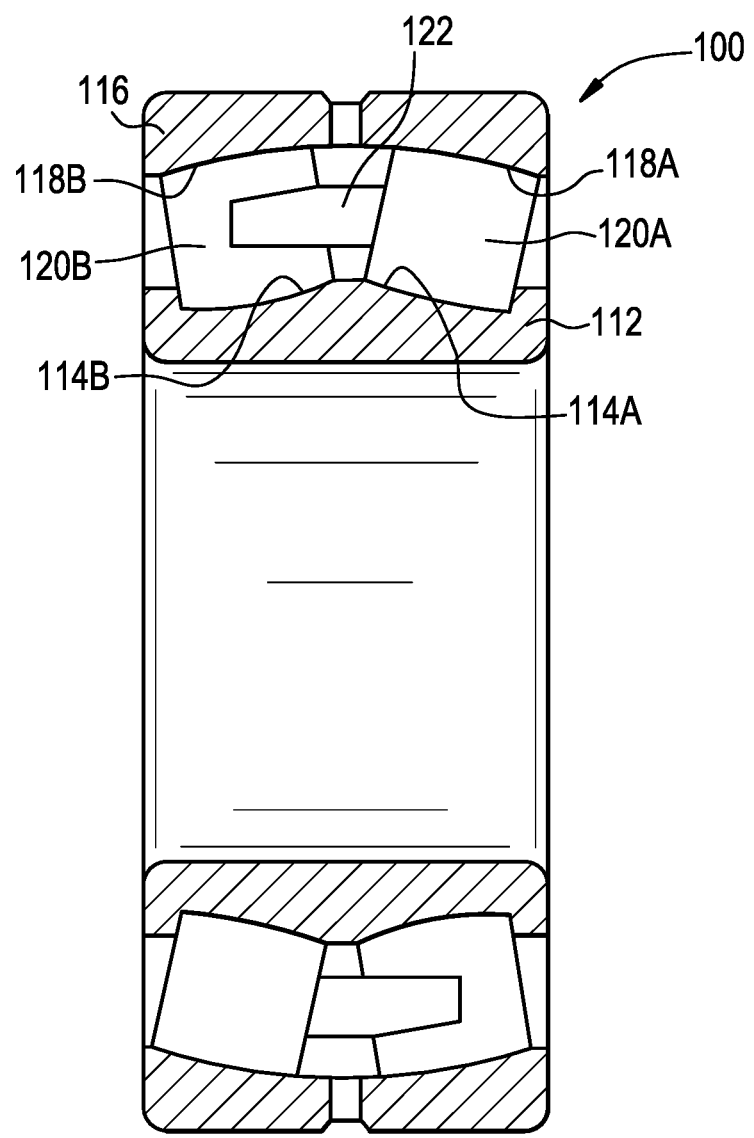
FIG. 3 is a cross sectional view of a prior art spherical roller bearing.

As shown in FIG. 2, the spacer ring 18 includes a circumferential channel 18C on an exterior circumferential surface 18E thereof and one or more holes 18H (e.g., three equally spaced holes) extending radially therethrough for supplying a lubricant to an interior are within the tapered roller bearing 10. The lubricant flows in the direction of the arrows F1, shown in FIG. 1.

As shown in FIG. 5, the tapered roller bearing assembly 10 includes a cage 40 that includes a first annular disc 42A and a second annular disc 42B each positioned axially outward, relative to a longitudinal axis A1 of each of the plurality of first rolling elements 20. The first annular disc 42A is positioned proximate and parallel to a first axial end 20X of each of the plurality of first rolling elements 20. The first annular disc 42A has a plurality of holes 45A extending axially (i.e., coaxially with the longitudinal axis A1) through a thickness T1 thereof. The holes 45A are circumferentially equally spaced apart from one another. The second annular disc 42B is positioned proximate and parallel to a second axial end 20Y of each of the plurality of first rolling elements 20. The second annular disc 42B has a plurality of holes 45B extending axially (i.e., coaxially with the longitudinal axis A1) through a thickness T1 thereof. The holes 45B are circumferentially equally spaced apart from one another. A plurality of pins 44 extend axially (i.e., coaxially with the longitudinal axis A1) inward from the first annular disc 42A to the second annular disc 42B. As best shown in FIG. 5, each of the pins 44 extend between and are secured to the first annular disc 42A and the second annular disc 42B. Each of the pins 44 extend into a respective one of the holes 45A and a respective one of the holes 45B. Opposite ends of each of the pins 44 are secured (e.g., welded, press fit or swaged) in the respective one of the holes 45A and 45B. Each of the pins 44 extends through a respective bore 25 of one of the first rolling elements 20 so that each of the first rolling elements 20 is rotatable about the respective pin 44.

As shown in FIG. 5, the tapered roller bearing assembly 10 includes a cage 40' that includes a first annular disc 42A' and a second annular disc 42B' each positioned axially outward, relative to a longitudinal axis A2 of each of the plurality of second rolling elements 22. The first annular disc 42A' is positioned proximate and parallel to a first axial end 22X of each of the plurality of second rolling elements 22. The first annular disc 42A' has a plurality of holes 45A' extending axially (i.e., coaxially with the longitudinal axis A2) through a thickness T1 thereof. The holes 45A' are circumferentially equally spaced apart from one another. The second annular disc 42B' is positioned proximate and parallel to a second axial end 22Y of each of the plurality of second rolling elements 22. The second annular disc 42B' has a plurality of holes 45B' extending axially through a thickness thereof. The holes 45B' are circumferentially equally spaced apart from one another. A plurality of pins 44' extend axially (i.e., coaxially with the longitudinal axis A2) inward from the first annular disc 42A' to the second annular disc 42B'. As best shown in FIG. 5, each of the pins 44' extend between and are secured to the first annular disc 42A' and the second annular disc 42B'. Each of the pins 44' extend into a respective one of the holes 45A' and a respective one of the holes 45B'. Opposite ends of each of the pins 44' are secured (e.g., welded, press fit or swaged) in the respective one of the holes 45A' and 45B'. Each of the pins 44' extends through a respective bore 25' of one of the second rolling elements 22 so that each of the second rolling elements 22 is rotatable about the respective pin 44'.

The tapered roller bearing assembly 10 has non-standard design (i.e., not within the American Bearing Manufacturers Association Standards (AMBA)). The AMBA standards do not disclose any pinned cage type bearings. The AMBA standards merely disclose taper angles θ greater than 12 degrees, for example 14 degrees, or more, but fail to disclose any taper angles from 11 degrees to 12 degrees as shown and described herein for the tapered roller bearing assembly 10 of the present invention. Thus, as a result of much testing and analysis the inventors have surprisingly arrived at a novel and nonobvious tapered roller bearing assembly 10 which is configured and customized to reach higher bearing capacities than the prior art bearings disclosed in the AMBA standards.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:
1. A tapered roller bearing assembly comprising:
a one-piece inner ring being concentric about a longitudinal axis, the inner ring having a first outer raceway oriented at a first angle relative to the longitudinal axis and a second outer raceway oriented at a second angle relative to the longitudinal axis;
a first outer ring having a first inner raceway oriented substantially parallel to the first outer raceway, the first outer ring being positioned around a portion of the inner ring;
a second outer ring having a second inner raceway oriented substantially parallel to the second outer raceway, the second outer ring being positioned around a portion of the inner ring;
a spacer ring having a predetermined axial width, the spacer ring being positioned around a portion of the inner ring and between the first outer ring and the second outer ring;
a plurality of first rolling elements disposed between the first outer ring and the inner ring and in rolling engagement with the first outer raceway and the first inner raceway;
a plurality of second rolling elements disposed between the second outer ring and the inner ring and in rolling engagement with the second outer raceway and the second inner raceway;

the predetermined width being selectively established to obtain a predetermined axial clearance between the inner ring and the first outer ring and the second outer ring; and wherein the spacer ring, the first outer ring and the second outer ring each have a plurality of bores axially extending therethrough and positioned circumferentially around peripheries thereof; and a fastener extending into each of the bores to secure the spacer ring between the first outer ring and the second outer ring to establish the predetermined axial clearance.

2. The tapered roller bearing assembly of claim 1, where the fastener comprises a head portion proximate a first end thereof and a threaded area proximate a second end thereof, the threaded area having a locking device and nut thereon, the nut being tightened on the threaded area.

3. The tapered roller bearing assembly of claim 2, wherein the locking device comprises teeth that grip a first portion of the at least one of the first outer ring and the second outer ring, wherein the first portion of an axial surface of at least one of the first outer ring and the second outer has a first hardness that is less than a second hardness of other portions of at least one of the first outer ring and the second outer ring.

4. The tapered roller bearing assembly of claim 1, wherein at least one of the spacer ring, the first outer ring and the second outer ring is manufactured from a metallic material.

5. The tapered roller bearing assembly of claim 1, wherein at least one of the spacer ring, the first outer ring and the second outer ring is manufactured from an iron based alloy and wherein a first portion of an axial surface of at least one of the first outer ring and the second outer has a first hardness that is less than a second hardness of other portions of at least one of the first outer ring and the second outer ring.

6. The tapered roller bearing assembly of claim 5, wherein the other portions of the at least one of the first outer ring and the second outer ring are carburized with the first portions being masked during carburizing to obtain the first hardness.

7. The tapered roller bearing assembly of claim 1, wherein the second angle is 180 degrees minus the first angle.

8. The tapered roller bearing assembly of claim 7, wherein the first angle is from 11 degrees to 12 degrees.

9. The tapered roller bearing assembly of claim 1, wherein the spacer ring comprises a circumferential channel on an exterior circumferential surface thereof and at least one hole extending radially therethrough for supplying a lubricant to an interior area within the tapered roller bearing.

10. The tapered roller bearing assembly of claim 1, wherein the plurality of bores are equally spaced circumferentially apart from one another.

11. The tapered roller bearing assembly of claim 1, further comprising:

a first pinned cage configured to circumferentially space each of the first rolling elements from adjacent ones of the first rolling elements.

12. The tapered roller bearing assembly of claim 11, wherein the first pinned cage comprises a first annular disc and a second annular disc having a plurality of first pins extending therebetween; and wherein one of the first rolling elements is rotatingly mounted on a respective one of the first pins.

13. The tapered roller bearing assembly of claim 1, further comprising:

a second pinned cage configured to circumferentially space each of the second rolling elements from adjacent ones of the second rolling elements.

14. The tapered roller bearing assembly of claim 13, wherein the second pinned cage comprises a third annular disc and a fourth annular disc having a plurality of second pins extending therebetween; and wherein one of the second rolling elements is rotatingly mounted on a respective one of the second pins.

15. A tapered roller bearing assembly comprising:

a one-piece inner ring being concentric about a longitudinal axis, the inner ring having a first outer raceway oriented at a first angle relative to the longitudinal axis and a second outer raceway oriented at a second angle relative to the longitudinal axis;

a first outer ring having a first inner raceway oriented substantially parallel to the first outer raceway, the first outer ring being positioned around a portion of the inner ring;

a second outer ring having a second inner raceway oriented substantially parallel to the second outer raceway, the second outer ring being positioned around a portion of the inner ring;

a spacer ring having a predetermined axial width, the spacer ring being positioned around a portion of the inner ring and between the first outer ring and the second outer ring;

a plurality of first rolling elements disposed between the first outer ring and the inner ring and in rolling engagement with the first outer raceway and the first inner raceway;

a plurality of second rolling elements disposed between the second outer ring and the inner ring and in rolling engagement with the second outer raceway and the second inner raceway;

the predetermined width being selectively established to obtain a predetermined axial clearance between the inner ring and the first outer ring and the second outer ring; and wherein at least one of the spacer ring, the first outer ring and the second outer ring is manufactured from an iron based alloy and wherein a first portion of an axial surface of at least one of the first outer ring and the second outer has a first hardness that is less than a second hardness of other portions of at least one of the first outer ring and the second outer ring.

16. The tapered roller bearing assembly of claim 15, wherein the spacer ring, the first outer ring and the second outer ring each have a plurality of bores axially extending therethrough and positioned circumferentially around peripheries thereof; and a fastener extending into each of the bores to secure the spacer ring between the first outer ring and the second outer ring to establish the predetermined axial clearance.

17. The tapered roller bearing assembly of claim 16, where the fastener comprises a head portion proximate a first end thereof and a threaded area proximate a second end thereof, the threaded area having a locking device and nut thereon, the nut being tightened on the threaded area.

18. The tapered roller bearing assembly of claim 17, wherein the locking device comprises teeth that grip a first portion of the at least one of the first outer ring and the second outer ring, wherein the first portion of an axial surface of at least one of the first outer ring and the second outer has a first hardness that is less than a second hardness of other portions of at least one of the first outer ring and the second outer ring.

19. The tapered roller bearing assembly of claim 16, wherein the plurality of bores are equally spaced circumferentially apart from one another.

20. The tapered roller bearing assembly of claim 15, wherein at least one of the spacer ring, the first outer ring and the second outer ring is manufactured from a metallic material.

21. The tapered roller bearing assembly of claim 15, wherein the other portions of the at least one of the first outer ring and the second outer ring are carburized with the first portions being masked during carburizing to obtain the first hardness.

22. The tapered roller bearing assembly of claim 15, wherein the second angle is 180 degrees minus the first angle.

23. The tapered roller bearing assembly of claim 22, wherein the first angle is from 11 degrees to 12 degrees.

24. The tapered roller bearing assembly of claim 15, wherein the spacer ring comprises a circumferential channel on an exterior circumferential surface thereof and at least one hole extending radially therethrough for supplying a lubricant to an interior area within the tapered roller bearing.

25. The tapered roller bearing assembly of claim 15, further comprising:
a first pinned cage configured to circumferentially space each of the first rolling elements from adjacent ones of the first rolling elements.

26. The tapered roller bearing assembly of claim 25, wherein the first pinned cage comprises a first annular disc and a second annular disc having a plurality of first pins extending therebetween; and
wherein one of the first rolling elements is rotatingly mounted on a respective one of the first pins.

27. The tapered roller bearing assembly of claim 15, further comprising:
a second pinned cage configured to circumferentially space each of the second rolling elements from adjacent ones of the second rolling elements.

28. The tapered roller bearing assembly of claim 27, wherein the second pinned cage comprises a third annular disc and a fourth annular disc having a plurality of second pins extending therebetween; and
wherein one of the second rolling elements is rotatingly mounted on a respective one of the second pins.

* * * * *